United States Patent
Aravkin et al.

(10) Patent No.: US 9,299,268 B2
(45) Date of Patent: Mar. 29, 2016

(54) TAGGING SCANNED DATA WITH EMOTIONAL TAGS, PREDICTING EMOTIONAL REACTIONS OF USERS TO DATA, AND UPDATING HISTORICAL USER EMOTIONAL REACTIONS TO DATA

(71) Applicant: International Business Machines Corporation, Armonk, NY (US)

(72) Inventors: Aleksandr Aravkin, Bronx, NY (US); Dimitri Kanevsky, Ossining, NV (US); Peter K. Malkin, Yorktown Heights, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 14/278,265

(22) Filed: May 15, 2014

(65) Prior Publication Data

US 2015/0332603 A1    Nov. 19, 2015

(51) Int. Cl.
| | |
|---|---|
| *G06F 15/18* | (2006.01) |
| *G09B 19/00* | (2006.01) |
| *G09B 5/06* | (2006.01) |
| *G09B 5/04* | (2006.01) |

(52) U.S. Cl.
CPC ........ *G09B 19/00* (2013.01); *G09B 5/04* (2013.01); *G09B 5/062* (2013.01); *G09B 5/065* (2013.01)

(58) Field of Classification Search
USPC ...................................... 706/12, 45
See application file for complete search history.

(56) References Cited

U.S. PATENT DOCUMENTS

| | | | | |
|---|---|---|---|---|
| 7,930,676 B1* | 4/2011 | Thomas | ............... | G06F 9/44505 706/45 |
| 8,250,011 B2 | 8/2012 | van der Made | | |
| 8,443,290 B2 | 5/2013 | Bill | | |
| 2006/0277467 A1* | 12/2006 | Reponen | ................. | G06F 3/011 715/708 |
| 2009/0055484 A1 | 2/2009 | Vuong et al. | | |
| 2011/0014932 A1* | 1/2011 | Estevez | ................... | G01S 19/14 455/466 |
| 2012/0016208 A1 | 1/2012 | Janssen et al. | | |
| 2012/0296855 A1 | 11/2012 | Matzner et al. | | |
| 2013/0081081 A1 | 3/2013 | Wang | | |
| 2014/0240124 A1* | 8/2014 | Bychkov | ............... | A61B 5/0026 340/539.12 |
| 2014/0347265 A1* | 11/2014 | Aimone | ................. | G09G 3/003 345/156 |
| 2015/0199010 A1* | 7/2015 | Coleman | .............. | A61B 5/0006 345/156 |

FOREIGN PATENT DOCUMENTS

WO     02067194 A2     8/2002

OTHER PUBLICATIONS

Neviarouskaya et al., User study on AffectIM, an avatar-based Instant Messaging system employing rule-based affect sensing from text, Science Direct, 2010, pp. 1-19.*

(Continued)

*Primary Examiner* — David Vincent
(74) *Attorney, Agent, or Firm* — Yee & Associates, P.C.; Jeff Tang (57) ABSTRACT

Generating an emotional representation of received data content is provided. Data content corresponding to a user is received. In responsive to determining that the user requested an emotional representation of a predicted emotional reaction by the user to the received data content, the emotional representation of the received data content is generated based on the predicted emotional reaction by the user to the received data content.

20 Claims, 5 Drawing Sheets

(56) References Cited

OTHER PUBLICATIONS

Tsetserukou et al., Innovative Real-Time Communication System with Rich Emotional and Haptic Channels, 2010, Springer-Verlag, pp. 1-8.*

"A method of web site structure design with balance of user satisfaction and business result," IP.com Prior Art Database Technical Disclosure No. IPCOM000200449D, Oct. 4, 2010, 7 pages.

"CPC—Emotion tracking collaboration tool," IP.com Prior Art Database Technical Disclosure No. IPCOM000215261D, Feb. 23, 2012, 9 pages.

"Method for collabrative visual and text fusion for emotion recognition in online instant messaging," IP.com Prior Art Database Technical Disclosure No. IPCOM000220178D, Jul. 25, 2012, 5 pages.

Al Masum et al., "Emotion Sensitive News Agent: An Approach Towards User Centric Emotion Sensing from the News," IEEE/WIC/ACM International Conference on Web Intelligence, Nov. 2007, pp. 614-620.

Kim et al., "A Review on the Computational Methods for Emotional State Estimation from the Human EEG," Computational and Mathematical Methods in Medicine, vol. 2013, Article ID 573734, pp. 1-13.

Scherer et al., "Emotional Effects of Music: Production Rules," Music and emotion: Theory and research, Oct. 2001, pp. 361-392.

* cited by examiner

TAGGING SCANNED DATA WITH EMOTIONAL TAGS, PREDICTING EMOTIONAL REACTIONS OF USERS TO DATA, AND UPDATING HISTORICAL USER EMOTIONAL REACTIONS TO DATA

BACKGROUND

1. Field

The disclosure relates generally to data content and more specifically to generating an emotional representation of received data content based on a predicted emotional reaction by a user to the received data content.

2. Description of the Related Art

We live in an age of massive amounts of data where emails, text messages, updates, news stories, advertisements, social media postings, and the like bombard us all the time with information. As we receive all of this information, we respond to a lot of it emotionally. Sometimes the emotional reactions are clear and easy to predict, such as, for example, when receiving information that a family member is sick, we are concerned, worried, stressed, sad, et cetera. Other times the emotional reactions are more subtle, such as, for example, when receiving news stories, advertisements, and the like, we may be emotionally manipulated into feeling angry about a particular news story, bad about ourselves because we don't own a particular advertised product, and so on.

SUMMARY

According to one illustrative embodiment, a computer-implemented method for generating an emotional representation of received data content is provided. A computer receives data content corresponding to a user. In responsive to the computer determining that the user requested an emotional representation of a predicted emotional reaction by the user to the received data content, the computer generates the emotional representation of the received data content based on the predicted emotional reaction by the user to the received data content. According to other illustrative embodiments, a computer system and a computer program product for generating an emotional representation of received data content are provided.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
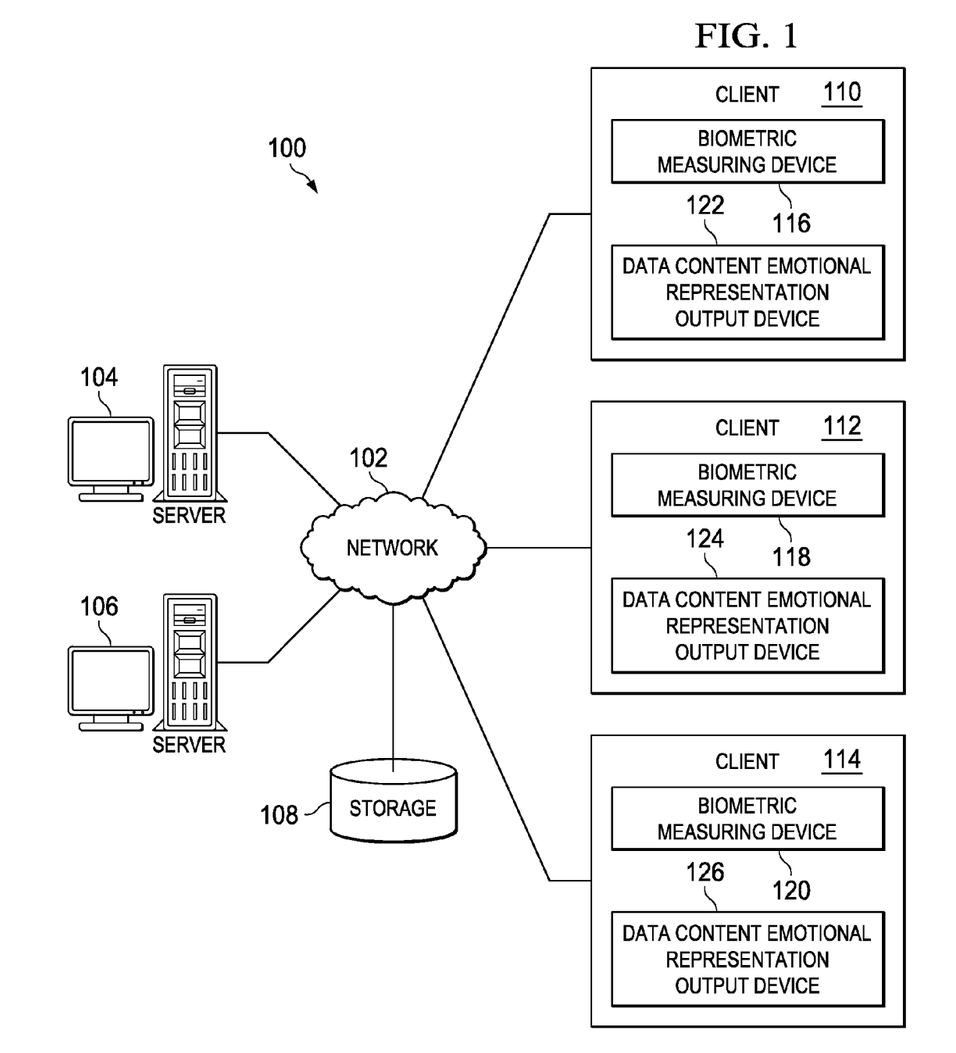
FIG. 1 is a pictorial representation of a network of data processing systems in which illustrative embodiments may be implemented.
Figure 2:
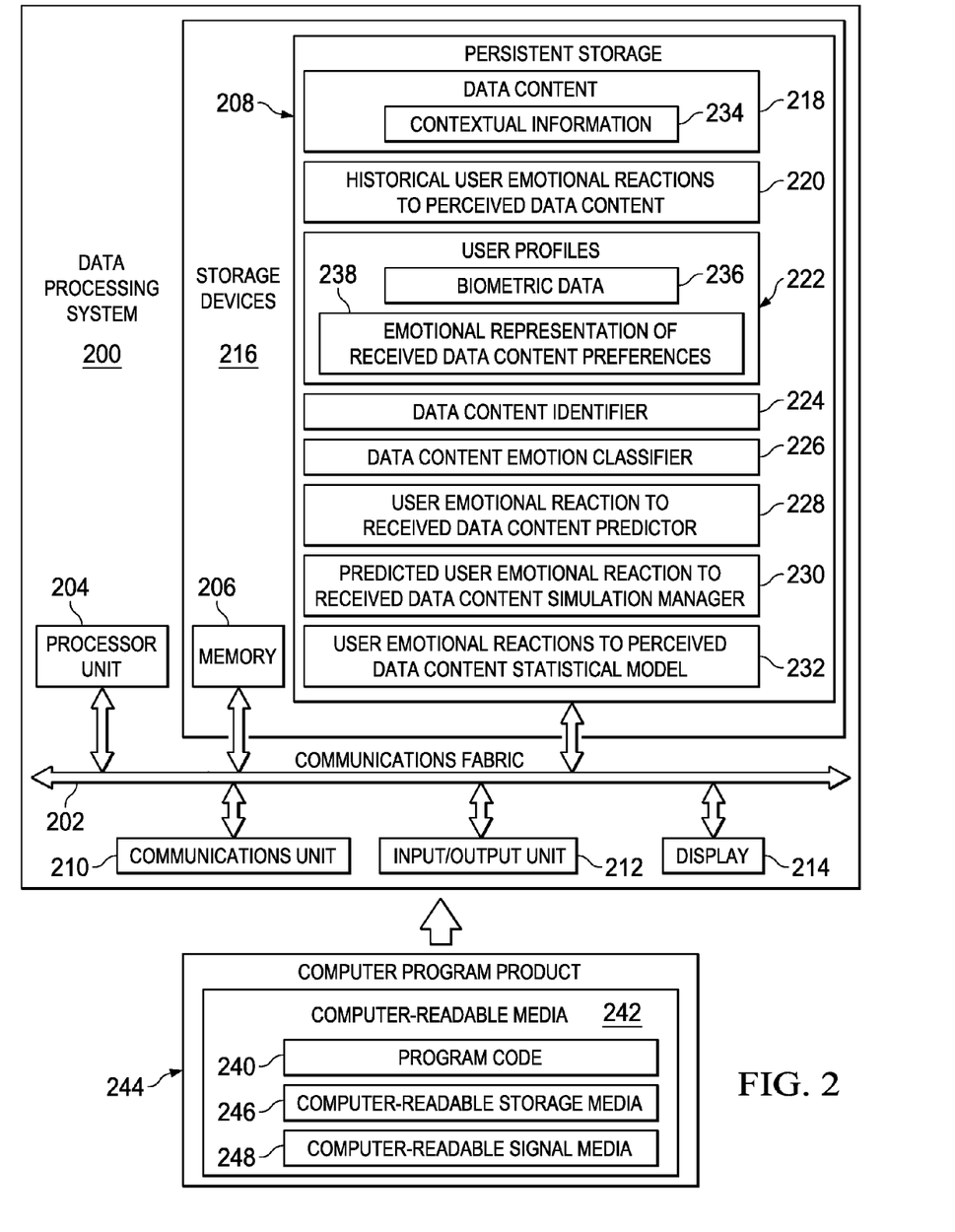
FIG. 2 is a diagram of a data processing system in which illustrative embodiments may be implemented.
Figure 3:
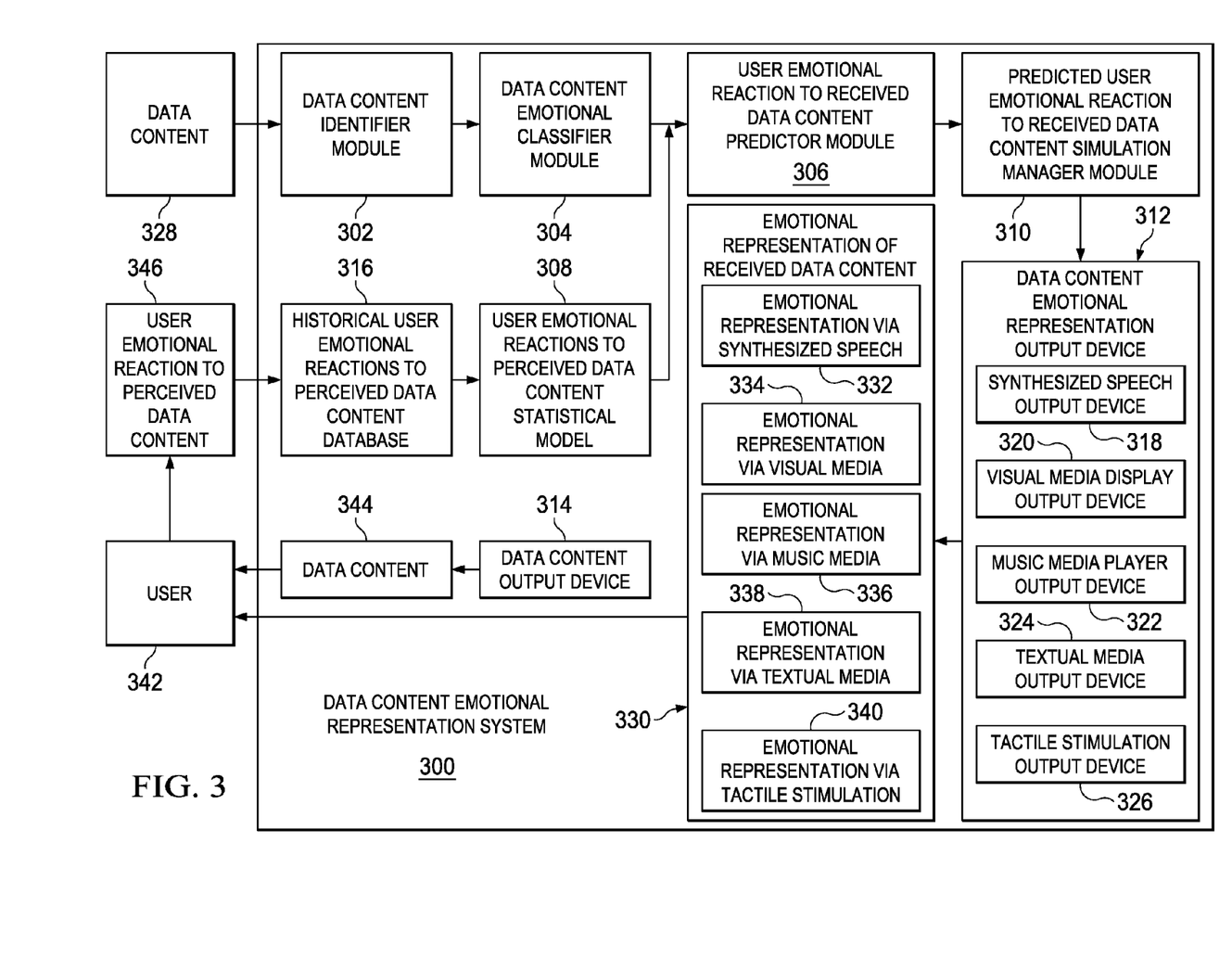
FIG. 3 is a diagram illustrating a data content emotional representation system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other data processing devices in which the illustrative embodiments may be implemented. Network data processing system 100 contains network 102, which is the medium used to provide communications links between the computers and the other data processing devices connected together within network data processing system 100. Network 102 may include connections, such as wire communication links, wireless communication links, or fiber optic cables.

In the depicted example, server 104 and server 106 connect to network 102, along with storage 108. Server 104 and server 106 may be, for example, server computers with high-speed connections to network 102. In addition, server 104 and/or server 106 may provide services to client devices connected to network 102. For example, server 104 and/or server 106 may provide one or more electronic data content communication system services, such as, for example, voice data content messaging services, video data content messaging services, textual data content messaging services, instant data content messaging services, e-mail data content messaging services, voicemail data content messaging services, video data content mail services, social media data content services, and the like, to the client devices.

Clients 110, 112, and 114 also connect to network 102. Clients 110, 112, and 114 are clients to server 104 and/or server 106. In the depicted example, server 104 and/or server 106 may provide information, such as boot files, operating system images, and applications to clients 110, 112, and 114. Users of clients 110, 112, and 114 may utilize clients 110, 112, and 114 to access the electronic data content communication services provided by server 104 and/or server 106.

Clients 110, 112, and 114 may be, for example, personal computers, network computers, and/or portable computers, such as laptop computers, with wire and/or wireless communication links to network 102. In addition, clients 110, 112, and 114 also may represent mobile data processing systems, such as cellular telephones, smart phones, personal digital assistants, gaming devices, or handheld computers, with wireless communication links to network 102. It should be noted that clients 110, 112, and 114 may represent any combination of computers and mobile data processing systems connected to network 102.

In addition, clients 110, 112, and 114 include biometric measuring devices 116, 118, and 120, respectively. Clients 110, 112, and 114 utilize biometric measuring devices 116, 118, and 120 to automatically capture, measure, and record biometric data that corresponds to users of clients 110, 112, and 114 while the users are perceiving data content within received electronic communications. Perceiving means viewing, listening, and/or reading the received data content by a user.

Each of biometric measuring devices 116, 118, and 120 may represent a set of one or more biometric measuring devices. For example, a set of biometric measuring devices may include at least one of: a sound capturing device, such as a microphone, with speech analyzing capabilities; an image capturing device, such as a video camera, with facial analyzing capabilities, posture analyzing capabilities, and breathing rate analyzing capabilities; a heart monitoring device with heart rate analyzing capabilities; a brain imaging device, such as a functional magnetic resonance imaging (fMRI) device or a positron emission tomography (PET) device, with brain activity blood flow analyzing capabilities; and a skin arousal capturing device, such as a galvanic skin response (GSR) device, with skin arousal analyzing capabilities. As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. In other examples, "at least one of" may be, for example, without limitation, two of item A, one of item B, and ten of item C; four of item B and seven of item C; and other suitable combinations. In other words, at least one of means any combination of items and number of items may be used from the list but not all of the items in the list are required.

Further, clients 110, 112, and 114 include data content emotional representation output devices 122, 124, and 126, respectively. Clients 110, 112, and 114 utilize data content emotional representation output devices 122, 124, and 126 to output emotional representations of received data content based on predicted emotional reactions by users of clients 110, 112, and 114 to the received data content. An emotional representation of received data content is an emotional summary of received data content that is provided to a user utilizing different forms of media or stimulation. For example, the emotional representation of the received data content may be output via, for example, synthesized speech, visual media, music media, textual media, tactile stimulation, et cetera.

Storage 108 is a network storage device capable of storing data in a structured or unstructured format. Storage 108 may be, for example, a database. Storage 108 may provide storage of a plurality of different user names and associated identification numbers; user profiles associated with the plurality of different users; user account information; a plurality of different types of data content and associated contextual information; and historical user emotional reactions to perceived data content by the plurality of users. The historical user emotional reactions to perceived data content may be manually inputted by users and/or automatically captured by biometric measuring devices, such as, for example, biometric measuring devices 116, 118, and 120 of clients 110, 112, and 114, respectively. Further, storage unit 108 may store other data, such as authentication or credential data that may include user identifiers, passwords, and biometric data associated with each of the plurality of users.

Also, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of computer readable storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a propagation medium. Memory 206, in these examples, may be, for example, a random access memory, or any other suitable volatile or non-volatile storage device.

Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores data content 218, historical user emotional reactions to perceived data content 220, user profiles 222, data content identifier 224, data content emotion classifier 226, user emotional reaction to received data content predictor 228, predicted user emotional reaction to received data content simulation manager 230, and user emotional reactions to perceived data content statistical model 232. However, it should be noted that persistent storage 208 may store any type of application, program, module, and data utilized by the different illustrative embodiments.

Data content 218 may represent any type of data or information. For example, data content 218 may be video data content, audio data content, and/or textual data content within e-mails, text messages, advertisements, news stories, social media postings, and the like. Data content 218 includes contextual information 234. Contextual information 234 is a set of one or more words or phrases included within data content 218 that provides a context of the information contained within data content 218. For example, contextual information 234 may indicate who sent data content 218, such as a family member, and/or provide an indication as to the type of information contained within data content 218, such as a wedding invitation.

Historical user emotional reactions to perceived data content 220 is a record of a plurality of different emotional reactions by a plurality of different users to a plurality of different perceived data content over a period of time. Historical user emotional reactions to perceived data content 220 may be manually inputted by different users after perceiving received data content and/or may be automatically captured by biometric measuring devices, such as biometric measuring devices 116, 118, and 120 in FIG. 1, while the different users are perceiving the received data content. Data processing system 200 may utilize historical user emotional reactions to perceived data content 220 to help predict what a particular user's current emotional reaction will be to received data content based on that particular user's previous emotional reaction to same or similar data content and/or previous emotional reactions by other users to same or similar data content.

User profiles 222 represent a plurality of different user profiles that are associated with the plurality of different users. Data processing system 200 may associate each user in the plurality of different users with a set of one or more user profiles. User profiles 222 include biometric data 236 and emotional representation of received data content preferences 238. However, it should be noted that user profiles 222 may include any data or information needed by the different illustrative embodiments.

Biometric data 236 represent a plurality different biometric data associated with the plurality of different users. Data processing system 200 may associate each user in the plurality of different users with a set of biometric data corresponding to each particular user. Data processing system 200 may utilize user biometric data 236 to help determine a particular user's emotional reaction to received data content. For example, data processing system 200 may utilize stored user biometric data 236 as a baseline for comparison with automatically captured biometric data corresponding to a particular user while the user was perceiving the received data content to help determine that particular user's emotional reaction to the received data content. In addition, data processing system 200 may utilize stored user biometric data 236 to automatically identify and verify a particular user's identity.

Emotional representation of received data content preferences 238 represent a plurality of different emotional representation of received data content preferences associated with the plurality of different users. Data processing system 200 may associate each user in the plurality of different users with a set of emotional representation of received data content preferences. Data processing system 200 may utilize emotional representation of received data content preferences 238 to determine a particular user's preferred emotional representation (i.e., emotional summary) of received data content. For example, a particular user may set a preference within the user's user profile to receive emotional representations of received data content via musical segments. However, it should be noted that a user may set a preference to receive emotional representations of received data content via a set of one or more different outputs, such as audio, visual, musical, textual, and/or tactual cues.

Data content identifier 224 is a software module that identifies different segments or portions, such as, for example, words and/or phrases, contained within received data content. Further, data content identifier 224 labels or tags the different identified segments or portions of the received data content with a corresponding emotional label or tag, if possible. In other words, some segments or portions of the received data content may not be able to be associated with an emotion.

Data content emotion classifier 226 is a software module that classifies the different identified segments or portions of received data content into a plurality of different emotional classifications based on the corresponding emotional labels or tags. User emotional reaction to received data content predictor 228 is a software module that predicts a particular user's emotional reaction to received data content based on contextual information 234 contained within received data content, historical user emotional reactions to perceived data content 220, user profiles 222, and/or emotional classifications of different identified segments or portions of received data content provided by data content emotion classifier 226.

Predicted user emotional reaction to received data content simulation manager 230 is a software module that simulates user emotional reactions to received data content by generating personalized emotional representations of received data content for output to a particular user based on emotional representation of received data content preferences 238. User emotional reactions to perceived data content statistical model 232 is a data model that incorporates data from a plurality of different data sources, such as, for example, contextual information 234 contained within data content 218, historical user emotional reactions to perceived data content 220, user profiles 222, and emotional classifications of data content 218 provided by data content emotion classifier 226. User emotional reactions to perceived data content statistical model 232 may be, for example, a hidden Markov model (HMM), a neural network (NN) model, a support vector machine (SVM) model, and the like. Data processing system 200 may utilize user emotional reactions to perceived data content statistical model 232 as input to user emotional reaction to received data content predictor 228 to help predict a particular user's emotional reaction to received data content.

Communications unit 210, in this example, provides for communication with other data processing systems and computing devices. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user. In addition, display 214 may include touch screen capabilities to receive user input.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 240 is located in a functional form on computer readable media 242 that is selectively removable and may be loaded onto or transferred to data processing system 200 for running by processor unit 204. Program code 240 and computer readable media 242 form computer program product 244. In one example, computer readable media 242 may be computer readable storage media 246 or computer readable signal media 248. Computer readable storage media 246 may include, for example, an optical or magnetic disc that is inserted or placed into a drive or other device that is part of persistent storage 208 for transfer onto a storage device, such as a hard drive, that is part of persistent storage 208. Computer readable storage media 246 also may take the form of a persistent storage, such as a hard drive, a thumb drive, or a flash memory that is connected to data processing system 200. In some instances, computer readable storage media 246 may not be removable from data processing system 200.

Alternatively, program code 240 may be transferred to data processing system 200 using computer readable signal media 248. Computer readable signal media 248 may be, for example, a propagated data signal containing program code 240. For example, computer readable signal media 248 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 240 may be downloaded over a network to persistent storage 208 from another device or data processing system through computer readable signal media 248 for use within data processing system 200. For instance, program code stored in a computer readable storage media in a data processing system may be downloaded over a network from the data processing system to data processing system 200. The data processing system providing program code 240 may be a server computer, a client computer, or some other device capable of storing and transmitting program code 240.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 246 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments it was discovered that quality of life can be improved tremendously by being able to predict emotional reactions to received information or data content. Illustrative embodiments use historical information regarding emotional reactions of users to perceived data content; captured emotional reactions of users to perceived data content through biomarkers, such as heart rate, posture evaluation, and breathing rate; self-reporting of emotional reactions to perceived data content by users; and general knowledge regarding users collected over time to predict emotional reactions of users to received data content. After predicting the emotional reactions of users to received data content, illustrative embodiments output an emotional representation of the received data content prior to the users perceiving the received data content. However, simply providing a textual or audio output, such as "you may feel 30% sad and 20% tense" regarding received data content, may be difficult for a user to interpret because the subject matter of the received data content may be emotionally charged.

As a result, illustrative embodiments may communicate the predicted emotional reaction of the user to the received data content via music, for example. Illustrative embodiments provide an "emotional summary" of the received data content so that if the received data content contains news about something bad that has happened, the user will know prior to perceiving the received data content because of the user's response to the emotional summary provided by illustrative embodiments. In addition, illustrative embodiments also may make users aware of emotions that the users experience when perceiving everyday information, such as news stories and advertisements. For example, a user that feels sad may realize that these feelings came from hearing an advertisement on the radio or from reading a social media posting online. Further, the user may realize that certain coworkers make the user feel tense and, thus, may avoid communicating with these coworkers whenever possible. Because illustrative embodiments may make users aware of their emotional reactions to data content or people, illustrative embodiments may help users to modify their emotional reactions or may help users to take action to avoid embarrassing situations and move on to more productive thinking. As another example, illustrative embodiments may assist a coach to identify the emotional state of team members and may even get the team members to change their emotions quickly to get a more positive outcome.

Illustrative embodiments may utilize affective computing to provision a specified emotional impact on users. Affective computing is the study and development of systems and devices that can recognize, interpret, process, and simulate human emotions. Affective computing is an interdisciplinary field spanning computer sciences, psychology, and cognitive science. An area within affective computing is the design of computational devices that can exhibit either innate emotional capabilities or that are capable of simulating emotions. A more practical approach, based on current technological capabilities, is the simulation of emotions in conversational agents in order to facilitate interactivity between humans and machines. While human emotions are often associated with surges in hormones and other neuropeptides, emotions in machines may be associated with abstract states associated with progress or lack of progress in autonomous learning systems. In this way, affective emotional states may correspond to time-derivatives (perturbations) in the learning curve of an arbitrary learning system.

Illustrative embodiments scan received data content and predict the emotional reaction to the received data content by a user. Illustrative embodiments may utilize contextual information contained within the received data content, such as is the data content a personal communication from a family member, a coworker, or friend, is the data content a general news story, or is the data content financial information from a bank. In addition, illustrative embodiments may interpret the received data content as to the tone of the data content or description of events contained within the data content. Further, illustrative embodiments may utilize learned historical information regarding users, such as how did a particular user that currently received data content react to the same or similar data content previously or how did other users react to the same or similar data content.

Thus, illustrative embodiments learn over time by monitoring each user to see how the users react to certain kinds and types of received data content. Illustrative embodiments also utilize general population information by collecting emotional reactions to general types of data content, such as, for example, news stories, that are perceived by groups of users. Further, illustrative embodiments output an "emotional summary" or emotional representation of received data content to users via, for example, music segments, sound bites, visual cues, and tactile cues. For example, illustrative embodiments may communicate relaxation, stress, ominous news, sadness, longing, et cetera, through music. Furthermore, illustrative embodiments may communicate feelings of unease, amusement, discomfort, comfort, et cetera, using tactile cues, such as air currents from a fan located in a client device associated with a user. For example, illustrative embodiments may run the fan at a slow speed with a warmed air current to communicate a feeling of comfort or warmth to a user or may run the fan at a high speed with a chilled air current to communicate a feeling of discomfort or ill will to the user.

Illustrative embodiments to promote special emotional reactions with music, for example, may utilize a music library that has various music segments labeled or tagged with an associated emotion. Illustrative embodiments also may utilize historical information regarding how various music segments affect the different users. Illustrative embodiments may continuously monitor the users so that if a user is getting tense or sad, illustrative embodiments may output comfort music to the user so that the user may notice the comfort music prompting the user to change to a more positive emotional state. Further, illustrative embodiments try to predict how emotions will be impacted by received data content and then try to influence these emotions. For example, if illustrative embodiments predict that a user's emotional reaction to a particular piece of bad news may be suicidal, then illustrative embodiments may withhold playing for that user sad music, which follows bad news, and instead play for that user happy music to make that user feel better before providing the user with the bad news.

Furthermore, illustrative embodiments may allow a user to quickly scan a plurality of received data content for predicted emotional reactions by the user to each of the plurality of received data content. For example, illustrative embodiments may allow a user to scroll over a list of received e-mails within the user's inbox one by one and receive an emotional representation or summary of each of the plurality of received e-mails via, for example, musical segments, prior to the user opening a received e-mail to determine whether or not to open an e-mail based on the corresponding emotional representation.

With reference now to FIG. 3, a diagram illustrating a data content emotional representation system is depicted in accordance with an illustrative embodiment. Data content emotional representation system 300 is a system of hardware and software components that generate emotional representations of received data content based on predicted user emotional reactions to the received data content. Data content emotional representation system 300 may be implemented in computer such as, for example, data processing system 200 in FIG. 2. However, it should be noted that different components of data content emotional representation system 300 may be distributed in two or more data processing systems in a network of data processing systems, such as, for example, server 104 and client 110 in network data processing system 100 in FIG. 1.

In this example, data content emotional representation system 300 includes data content identifier module 302, data content emotion classifier module 304, user emotional reaction to received data content predictor module 306, user emotional reactions to perceived data content statistical model 308, predicted user emotional reaction to received data content simulation manager module 310, data content emotional representation output device 312, data content output device 314, and historical user emotional reactions to perceived data content database 316. However, it should be noted that data content emotional representation system 300 may include more or fewer components than shown.

Data content identifier module 302 may be, for example, data content identifier 224 in FIG. 2. Data content identifier module 302 identifies and labels different segments or portions of received data content 328 with a corresponding emotion label. Data content 328 may be, for example, data content 218 that includes contextual information 234 in FIG. 2.

Data content identifier module 302 sends the labeled segments or portions of received data content 328 to data content emotion classifier module 304. Data content emotion classifier module 304 may be, for example, data content emotion classifier 226 in FIG. 2. Data content emotion classifier module 304 classifies the labeled segments or portions of received data content 328 into a set of one or more different emotional classifications based on the corresponding emotional labels of the different segments.

Data content emotion classifier module 304 sends the emotionally classified segments or portions of received data content 328 to user emotional reaction to received data content predictor module 306. User emotional reaction to received data content predictor module 306 may be, for example, user emotional reaction to received data content predictor 228 in FIG. 2. User emotional reaction to received data content predictor module 306 predicts the emotional reaction of user 342 to received data content 328 based on the emotionally classified segments or portions of received data content 328 provided by data content emotion classifier module 304. In addition, user emotional reaction to received data content predictor module 306 may base the prediction of the emotional reaction of user 342 on information provided by user emotional reactions to perceived data content statistical model 308. User emotional reactions to perceived data content statistical model 308 may be, for example, user emotional reactions to perceived data content statistical model 232 in FIG. 2.

User emotional reaction to received data content predictor module 306 sends the prediction of the emotional reaction by user 342 to received data content 328 to predicted user emotional reaction to received data content simulation manager module 310. Predicted user emotional reaction to received data content simulation manager module 310 may be, for example, predicted user emotional reaction to received data content simulation manager 230 in FIG. 2. Predicted user emotional reaction to received data content simulation manager module 310 simulates the emotional reaction by user 342 to received data content 328 by generating emotional representations of received data content 328 for output to user 342. The generated emotional representation of received data content 328 may be based on emotional representation of received data content preferences, such as emotional representation of received data content preferences 238 in FIG. 2, within a user file corresponding to user 342.

Predicted user emotional reaction to received data content simulation manager module 310 sends the generated emotional representations of received data content 328 to data content emotional representation output device 312. Data content emotional representation output device 312 is a set of one or more output devices capable of outputting the generated emotional representations of received data content 328. For example, data content emotional representation output device 312 may include one or more of synthesized speech output device 318, visual media display output device 320, music media player output device 322, textual media output device 324, and tactile stimulation output device 326. Tactile stimulation output device 326 may be, for example, a variable speed fan and/or vibration device with temperature changing capabilities.

Data content emotional representation output device 312 outputs emotional representation of received data content 330 to user 342. Emotional representation of received data content 330 may include one or more of emotional representation via synthesized speech 332, emotional representation via visual media 334, emotional representation via music media 336, emotional representation via textual media 338, and emotional representation via tactile simulation 340. Emotional representation via synthesized speech 332 provides an emotional summary of data content 328 to user 342 via a set of one or more machine generated voice messages. Emotional representation via visual media 334 provides an emotional summary of data content 328 to user 342 via a set of one or more visual images, such as, for example, colors, graphics, pictures, and/or video segments. Emotional representation via music media 336 provides an emotional summary of data content 328 to user 342 via a set of one or more musical segments. Emotional representation via textual media 338 provides an emotional summary of data content 328 to user 342 via a set of one or more textual messages. Emotional representation via tactile simulation 340 provides an emotional summary of data content 328 to user 342 via a set of one or more tactual cues, such as, for example, air currents and/or vibrations. Tactile stimulation output device 326 may control and vary the temperature and the speed of different air currents and/or vibrations to convey different emotional representations.

Further, data content emotional representation system 300 utilizes data content output device 314 to output data content 344 to user 342. Data content output device 314 may be a display, such as display 214 in FIG. 2, for outputting visual and textual data content and/or a speaker for outputting audio data content, for example. Data content 344 is the same data content as received data content 328.

User emotional reaction to perceived data content 346 is the emotional reaction of user 342 to perceived data content 344. User emotional reaction to perceived data content 346 may be manually inputted by user 342 after perceiving data content 344 and/or may be automatically captured by a set of one or more biometric measuring devices included in a client device associated with user 342, such as biometric measuring device 116 of client 110 in FIG. 1, while user 342 is perceiving data content 344.

Historical user emotional reactions to perceived data content database 316 records user emotional reaction to perceived data content 346. Historical user emotional reactions to perceived data content database 316 feeds data into user emotional reactions to perceived data content statistical model 308 on a continuous basis or a predetermined time interval basis to update information contained within user emotional reactions to perceived data content statistical model 308.

Figure 4:
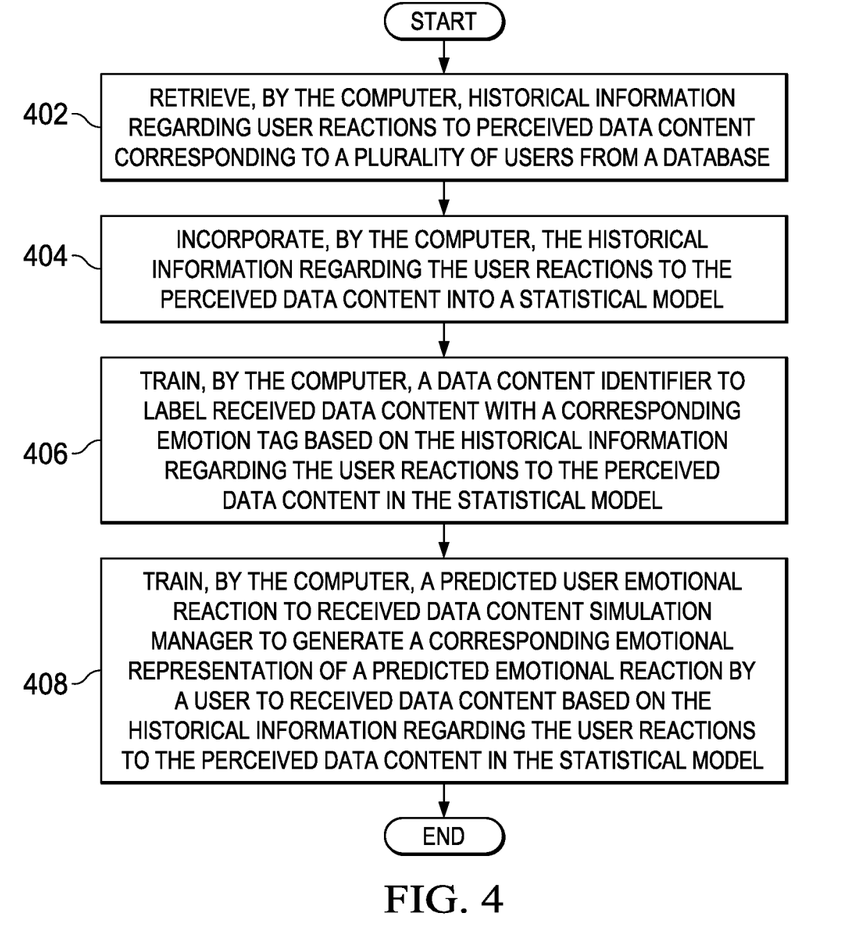
FIG. 4 is a flowchart illustrating a process for training a data content identifier and an emotional reaction to received data content simulation manager in accordance with an illustrative embodiment.

With reference now to FIG. 4, a flowchart illustrating a process for training a data content identifier and an emotional reaction to received data content simulation manager is shown in accordance with an illustrative embodiment. The process shown in FIG. 4 may be implemented in a computer, such as, for example, server 104 or client 110 in FIG. 1 or data processing system 200 in FIG. 2.

The process begins when the computer retrieves historical information regarding user reactions to perceived data content corresponding to a plurality of users from a database (step 402). The database may be, for example, historical user emotional reactions to perceived data content database 316 in FIG. 3. Afterward, the computer incorporates the historical information regarding the user reactions to the perceived data content into a statistical model (step 404). The statistical model may be, for example, user emotional reactions to perceived data content statistical model 308 in FIG. 3.

Subsequently, the computer trains a data content identifier to label received data content with a corresponding emotion tag based on the historical information regarding the user reactions to the perceived data content in the statistical model (step 406). The data content identifier may be, for example, data content identifier module 302 in FIG. 3. In addition, the computer trains a predicted user emotional reaction to received data content simulation manager to generate a corresponding emotional representation of a predicted emotional reaction by a user to received data content based on the historical information regarding the user reactions to the perceived data content in the statistical model (step 408). The predicted user emotional reaction to received data content simulation manager may be, for example, predicted user emotional reaction to received data content simulation manager module 310 in FIG. 3. The process terminates thereafter.

Figure 5:
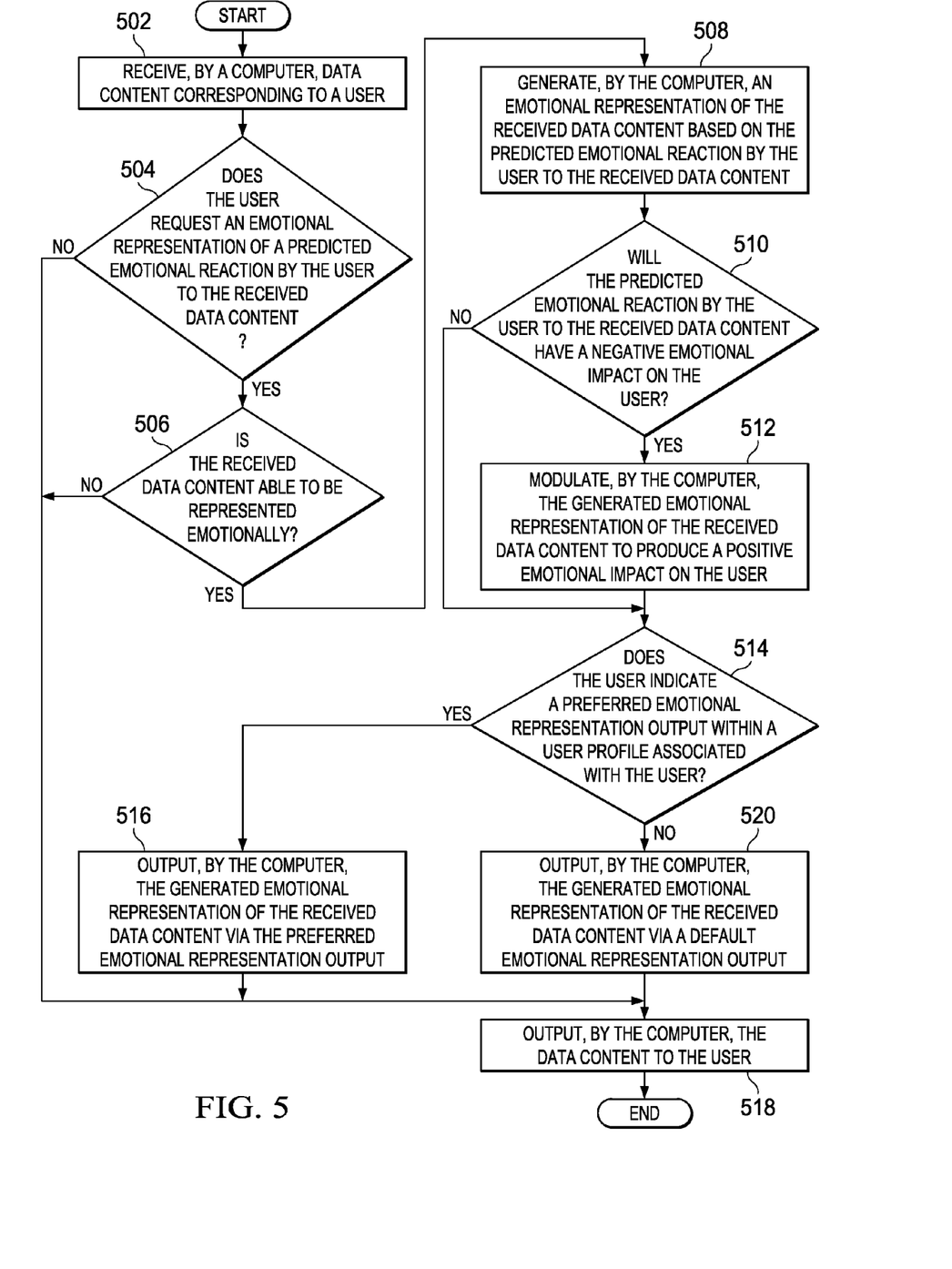
FIG. 5 is a flowchart illustrating a process for generating an emotional representation of received data content in accordance with an illustrative embodiment.

With reference now to FIG. 5, a flowchart illustrating a process for generating an emotional representation of received data content is shown in accordance with an illustrative embodiment. The process shown in FIG. 5 may be implemented in a computer, such as, for example, client 110 in FIG. 1 or data processing system 200 in FIG. 2.

The process begins when the computer receives data content corresponding to a user (step 502). The received data content corresponding to a user may be, for example, data content 328 corresponding to user 342 in FIG. 3. Afterward, the computer makes a determination as to whether the user requests an emotional representation of a predicted emotional reaction by the user to the received data content (step 504).

If the computer determines that the user did not request an emotional representation of a predicted emotional reaction by the user to the received data content, no output of step 504, then the process proceeds to step 518. If the computer determines that the user did request an emotional representation of a predicted emotional reaction by the user to the received data content, yes output of step 504, then the computer makes a determination as to whether the computer is able to represent the received data content emotionally (step 506). If the computer determines that the computer is not able to represent the received data content emotionally, no output of step 506, then the process proceeds to step 518. If the computer determines that the computer is able to represent the received data content emotionally, yes output of step 506, then the computer generates an emotional representation of the received data content based on the predicted emotional reaction by the user to the received data content (step 508). The emotional representation of the received data content may be, for example, emotional representation of received data content 330 in FIG. 3.

In addition, the computer makes a determination as to whether the predicted emotional reaction by the user to the received data content will have a negative emotional impact on the user (step 510). A negative emotional impact on the user may be an emotional impact that makes the user feel, for example, sad, angry, irritable, apprehensive, anxious, fearful, humiliated, weak, and the like. If the computer determines that the predicted emotional reaction by the user to the received data content will not have a negative emotional impact on the user, no output of step 510, then the process proceeds to step 514. If the computer determines that the predicted emotional reaction by the user to the received data content will have a negative emotional impact on the user, yes output of step 510, then the computer modulates the generated emotional representation of the received data content to produce a positive emotional impact on the user (step 512). A positive emotional impact on the user may be an emotional impact that makes the user feel, for example, happy, elated, joyful, calm, relaxed, encouraged, fearless, strong, and the like.

Further, the computer makes a determination as to whether the user indicates a preferred emotional representation output within a user profile associated with the user (step 514). The user profile associated with the user may be, for example, a user profile in user profiles 222 that includes emotional representation of received data content preferences 238 in FIG. 2. If the computer determines that the user did indicate a preferred emotional representation output within a user profile associated with the user, yes output of step 514, then the computer outputs the generated emotional representation of the received data content via the preferred emotional representation output (step 516). Furthermore, the computer outputs the received data content to the user using a data content output device, such as, for example, display 214 in FIG. 2 (step 518). However, the data content output device also may include a speaker or any other type of media output device.

Returning again to step 514, if the computer determines that the user did not indicate a preferred emotional representation output within a user profile associated with the user, no output of step 514, then the computer outputs the generated emotional representation of the received data content via default emotional representation output (step 520). The default emotional representation may be, for example, a musical summary of the received data content. Thereafter, the process returns to step 518 where the computer outputs the received data content to the user.

Thus, illustrative embodiments provide a computer-implemented method, computer system, and computer program product for generating an emotional representation of received data content based on a predicted emotional reaction by a user to the received data content. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for generating an emotional representation of received data content, the computer-implemented method comprising:

receiving, by a computer, data content corresponding to a user;

responsive to the computer determining that the user requested an emotional representation of a predicted emotional reaction by the user to the received data content:

scanning, by the computer, the received data content;

tagging, by the computer, a segment of the received data content scanned, with a corresponding emotional tag;

classifying, by the computer, segments tagged into a respective emotional classification in a plurality of classifications according to the corresponding emotional tag;

predicting, by the computer, an emotional reaction of the user to the received data content using information comprising contextual information contained within the received data content, information from a historical user emotional reactions to perceived data content database, user profiles, respective emotional classifications of different identified segments of the received data content and a user emotional reactions to perceived data content statistical model;

generating, by the computer simulating the emotional reaction of the user to the received data content, a personalized emotional representation of the received data content for output based on emotional representation of received data content preferences and using the emotional reaction of the user to the received data content as predicted; and monitoring, by the computer, the user to identify a reaction to each classification of further received data content, wherein responsive to identifying the reaction, the computer stores an update in the historical user emotional reactions to perceived data content database.

2. The computer-implemented method of claim 1, further comprising:
responsive to the computer determining that the emotional reaction of the user to the received data content as predicted will have a negative emotional impact on the user, modulating, by the computer, the personalized emotional representation of the received data content generated to produce a positive emotional impact on the user, wherein the positive emotional impact is selected from a plurality of positive emotional impacts to make the user feel, one of happy, elated, joyful, calm, relaxed, encouraged, fearless, and strong.

3. The computer-implemented method of claim 1, further comprising:
responsive to the computer determining that the user indicated a preferred emotional representation output within a user profile associated with the user, outputting, by the computer, the personalized emotional representation of the received data content generated via the preferred emotional representation output.

4. The computer-implemented method of claim 3, wherein the preferred emotional representation output is at least one of an emotional representation via synthesized speech, an emotional representation via visual media, an emotional representation via music media, an emotional representation via textual media, and emotional representation via tactile simulation.

5. The computer-implemented method of claim 4, wherein the personalized emotional representation via tactile simulation is at least one of an air current and a vibration.

6. The computer-implemented method of claim 5, wherein a tactile stimulation output device controls and varies at least one of a temperature and a speed of the air current and the vibration.

7. The computer-implemented method of claim 1, wherein the computer automatically captures an emotional reaction by the user to the received data content while the user is perceiving the received data content using a set of biometric measuring devices associated with the computer, and wherein the computer stores the emotional reaction by the user to the received data content captured in a database.

8. The computer-implemented method of claim 7, further comprising:
retrieving, by the computer, historical information regarding user reactions to perceived data content corresponding to a plurality of users from the database; and
incorporating, by the computer, the historical information regarding user reactions to perceived data content corresponding to the plurality of users into a statistical model, wherein the computer utilizes the statistical model to generate the emotional reaction of the user to the received data content as predicted.

9. The computer-implemented method of claim 1, wherein the user scans a list of a plurality of received data content for predicted emotional reactions by the user to each of the plurality of received data content by scrolling over the list of the plurality of received data content one by one and receiving an emotional representation of each of the plurality of received data content.

10. The computer-implemented method of claim 1, further comprising:
outputting, by the computer, the received data content to the user.

11. A computer system for generating an emotional representation of received data content, the computer system comprising:
a bus system;
a storage device connected to the bus system, wherein the storage device stores computer readable program code; and
a processor unit connected to the bus system, wherein the processor unit executes the computer readable program code to:
receive data content corresponding to a user;
in response to determining that the user requested an emotional representation of a predicted emotional reaction by the user to the received data content:
scan the received data content;
tag a segment of the received data content scanned, with a corresponding emotional tag;
classify segments tagged into a classification in a plurality of classifications according to the corresponding emotional tag;
predict an emotional reaction of the user to the received data content using information comprising contextual information contained within the received data content, information from a historical user emotional reactions to perceived data content database, user profiles, respective emotional classifications of different identified segments of the received data content and a user emotional reactions to perceived data content statistical model;
generate, by simulating the emotional reaction of the user to the received data content, a personalized emotional representation of the received data content for output based on emotional representation of received data content preferences and using the emotional reaction of the user to the received data content as predicted; and
monitor the user to identify a reaction to each classification of further received data content, wherein responsive to identifying the reaction, the computer stores an update in the historical user emotional reactions to perceived data content database.

12. The computer system of claim 11, wherein the processor unit further executes the computer readable program code to modulate the personalized emotional representation of the received data content generated to produce a positive emotional impact on the user in response to determining that the emotional reaction of the user to the received data content as predicted will have a negative emotional impact on the user, wherein the positive emotional impact is selected from a plurality of positive emotional impacts to make the user feel, one of happy, elated, joyful, calm, relaxed, encouraged, fearless, and strong.

13. A computer program product stored on a computer readable storage medium having computer readable program code encoded thereon that is executable by a computer for generating an emotional representation of received data content, the computer program product comprising:
computer readable program code to receive data content corresponding to a user;
computer readable program code, in response to determining that the user requested an emotional representation of a predicted emotional reaction of the user to the received data content, to:
scan the received data content;
tag a segment of the received data content scanned, with a corresponding emotional tag;

classify segments tagged into a classification in a plurality of classifications according to the corresponding emotional tag;

predict an emotional reaction of the user to the received data content using information comprising contextual information contained within the received data content, information from a historical user emotional reactions to perceived data content database, user profiles, respective emotional classifications of different identified segments of the received data content and a user emotional reactions to perceived data content statistical model;

generate, by simulating the emotional reaction of the user to the received data content, a personalized emotional representation of the received data content for output based on emotional representation of received data content preferences and using the emotional reaction of the user to the received data content, as predicted; and monitor the user to identify a reaction to each classification of further received data content wherein responsive to identifying the reaction, the computer stores an update in the historical user emotional reactions to perceived data content database.

14. The computer program product of claim 13, further comprising:

computer readable program code to modulate the personalized emotional representation of the received data content generated to produce a positive emotional impact on the user in response to determining that the emotional reaction of the user to the received data content will have a negative emotional impact on the user, wherein the positive emotional impact is selected from a plurality of positive emotional impacts to make the user feel, one of happy, elated, joyful, calm, relaxed, encouraged, fearless, and strong.

15. The computer program product of claim 13, further comprising:

computer readable program code to output the personalized emotional representation of the received data content generated via a preferred emotional representation output in response to determining that the user indicated the preferred emotional representation output within a user profile associated with the user.

16. The computer program product of claim 15, wherein the preferred emotional representation output is at least one of an emotional representation via synthesized speech, an emotional representation via visual media, an emotional representation via music media, an emotional representation via textual media, and emotional representation via tactile simulation.

17. The computer program product of claim 16, wherein the personalized emotional representation via tactile simulation is at least one of an air current and a vibration.

18. The computer program product of claim 17, wherein a tactile stimulation output device controls and varies at least one of a temperature and a speed of the air current and the vibration.

19. The computer program product of claim 13, wherein the computer automatically captures an emotional reaction by the user to the received data content while the user is perceiving the received data content using a set of biometric measuring devices associated with the computer, and wherein the computer stores the emotional reaction by the user to the received data content captured in a database.

20. The computer program product of claim 19, further comprising:

computer readable program code to retrieve historical information regarding user reactions to perceived data content corresponding to a plurality of users from the database; and computer readable program code to incorporate the historical information regarding user reactions to perceived data content corresponding to the plurality of users into a statistical model, wherein the statistical model is utilized to generate the emotional reaction of the user to the received data content as predicted.

* * * * *